United States Patent [19]
Davidson

[11] 4,050,728
[45] Sept. 27, 1977

[54] SECOND HANDLE FOR ATTACHING TO A SHOVEL OR THE LIKE

[76] Inventor: Glenn E. Davidson, 205 Franklin, Sublette, Kans. 67877

[21] Appl. No.: 731,465

[22] Filed: Oct. 12, 1976

[51] Int. Cl.² .............................................. B25G 3/00
[52] U.S. Cl. ................................ 294/58; 16/114 R; 16/115
[58] Field of Search ............... 16/114 R, 115, 112; 294/58

[56] References Cited

U.S. PATENT DOCUMENTS

| 911,291 | 2/1909 | Byor | 294/58 |
|---|---|---|---|
| 1,374,061 | 4/1921 | Coleman | 294/58 |
| 1,586,056 | 5/1926 | Walsh | 294/58 |
| 2,047,485 | 7/1936 | McBrady | 16/115 UX |

FOREIGN PATENT DOCUMENTS

| 410,274 | 3/1925 | Germany | 294/58 |
|---|---|---|---|
| 915,288 | 1/1963 | United Kingdom | 294/58 |

*Primary Examiner*—Andrew V. Kundrat
*Attorney, Agent, or Firm*—Edwin H. Crabtree; John H. Widdowson

[57] ABSTRACT

A second handle for attaching to a shovel, or various types of garden tools having a handle attached thereto. The second handle having a universal joint at one end for attaching to the handle of the shovel. The universal joint allowing the user to pivot the second handle in various directions on the shovel for ease in lifting, pushing or pulling the material being handled.

4 Claims, 4 Drawing Figures

SECOND HANDLE FOR ATTACHING TO A SHOVEL OR THE LIKE

BACKGROUND OF THE INVENTION

This invention relates generally to garden tool accessories, and more particularly, but not by way of limitation, to a second handle for attaching to the handle of a shovel.

Heretofore, there have been various types of handle attachments providing a second handle for a shovel, fork, hoe and similar garden tools. Generally, the second handle is attached to the handle of the garden tool by a hinge. Also, second handles have been attached to garden tools using various types of clips or clamps.

None of the prior art handles provide the novel structure of a second handle having a universal joint at one end for attaching to the handle of the garden tool in combination with a hand grip pivotly mounted on the other end of the second handle.

SUMMARY OF THE INVENTION

The subject invention is light weight, durable and easily installed on a shovel or various types of garden tools having a handle.

The second handle provides a telescoping elongated tube for adjusting the length to accomodate people with various arm lengths.

The handle prevents the user of the garden tool from having to bend or stoop in using the tool, thereby greatly reducing the strain on the user's back and fatigue resulting therefrom. The invention allows the user of the garden tool to work in a narrow work area such as ditches or trenches and enables the operator to lift the material being handled without having to bend or stoop.

The second handle allows the user of a shovel to lift a load in various directions, such as forward, right, or left of the user, overhead, or over the shoulder of the user. The second handle can be pivoted in various directions on the handle of the shovel for aiding the user of the shovel in either lifting, pushing or pulling the material being handled.

The second handle includes, an elongated tube having an inner tube slidably received in an outer tube. The inner tube telescopes in the outer tube and includes apertures therethrough for receiving a bolt therein, so that the length of the tube can be adjusted. The tube has a swivel hand grip attached to one end for holding the second handle. The other end of the tube is attached to a universal joint. The universal joint is attached to the handle of the shovel. The universal joint provides means for pivoting the tube in a plane parallel to the plane of the shovel, and for pivoting the tube perpendicularly to the plane of the shovel.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1-A is an enlarged cut-away portion of the universal joint attached to the shovel handle.

DETAILED DESCRIPTION OF THE DRAWINGS

Figure 1A:
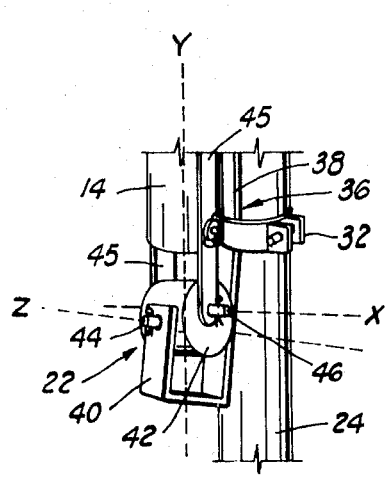
FIG. 1 is a perspective view of the second handle attached to a shovel.
Figure 1:
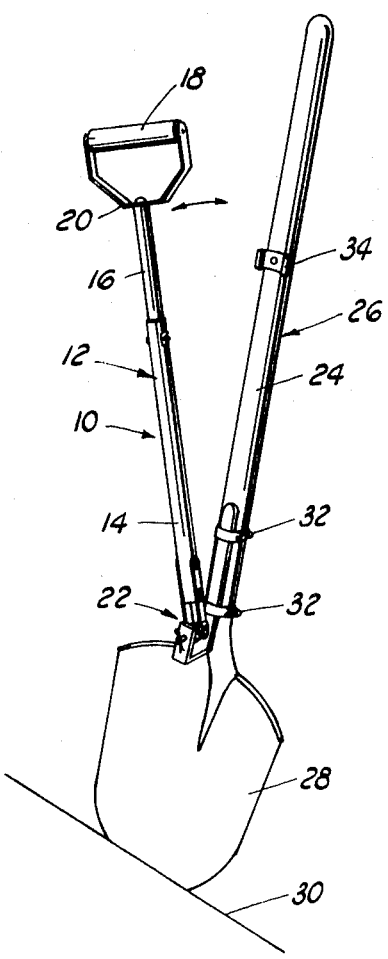

In FIG. 1, the second handle for attaching to a shovel is designated by general reference numeral 10. The second handle 10 includes an elongated tube 12 having an outer tube 14 and an inner tube 16. Attached to the top of the inner tube 16 is a hand grip 18. The hand grip 18 is pivotly attached to the tube 16 by a screw 20. The hand grip 18 is used for holding the second handle 10 and pivoting the hand grip 18 on the elongated tube 12.

A universal joint 22 is attached to the bottom of the outer tube 14 of the elongated tube 12 and to a handle 24 of a shovel 26. The shovel 26 includes a shovel blade 28 inserted into a portion of a ground surface 30. The universal joint 22 is attached to the shovel handle 24 by annular shaped clamps 32.

The second handle 10 further includes a spring clip 34 which is attached to the handle 24 of the shovel 26. The clip 34 receives a portion of the inner tube 16 of the elongated handle 12 when the second handle 10 is folded and disposed adjacent the handle 24 of the shovel 26.

In FIG. 1-A a sectional view of the universal joint 22 is illustrated. The universal joint 22 includes a "J" shaped mounting strap 36. The strap 36 includes a first arm 38 and a second arm 40. The first arm 38 is secured to the side of the shovel handle 24 by the annular clamps 32. A swivel 42 is pivotly mounted between the first arm 40 and second arm 38 of the swivel by a pin 44. The swivel 42 pivots about the pin 44 in a plane indicated by the dotted lines X and Y. This plane is parallel to the plane of the shovel handle and shovel blade 28.

In addition, the universal joint 22 includes a pair of straps 45 having apertures therethrough. The lower portion of the straps 45 are attached to the sides of the swivel 42 by a pin 46. The upper portion of the straps 44 are attached by bolts 47 and wing nuts 49 to the sides of the outer tube 14 of the elongated tube 12. The elongated tube 12 pivots on the pin 46 in a plane indicated by the dotted lines Y and Z. This plane is perpendicular to the plane of the shovel handle 24 and shovel blade 28. The universal joint 22 provides the flexibility of allowing the second handle 10 to pivot in two different planes thereby providing greater flexibility in the lifting of the shovel 26.

Figure 2:
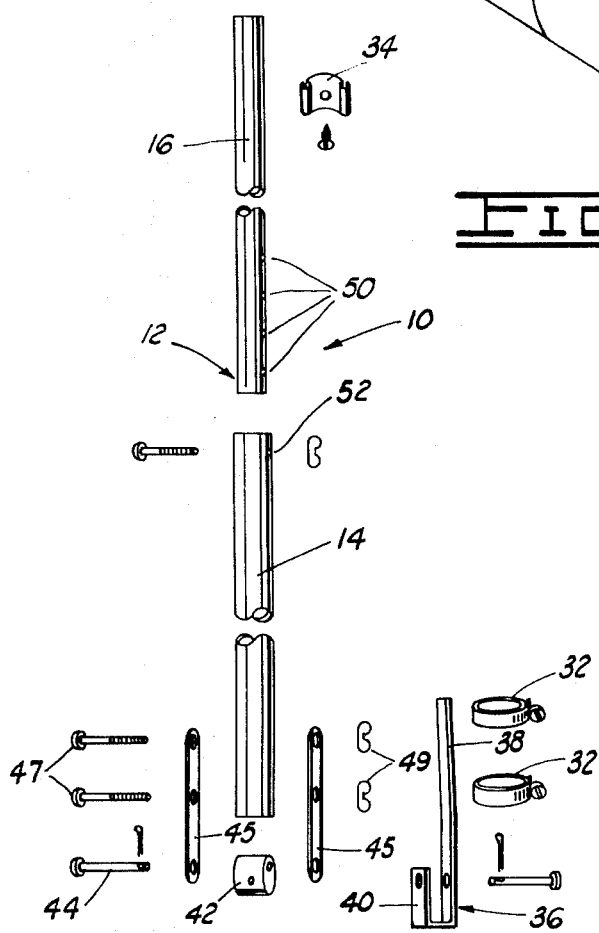
FIG. 2 is a front view of the individual parts of the second handle.

In FIG. 2, a front view of the second handle 10 is illustrated with the individual elements of the handle 10 in a disassembled form.

In this figure, the inner tube 16 can be seen having a plurality of apertures 50, which when indexed with a pair of apertures 52 through the outer tube 14 allow the elongated tube 12 to be adjusted in length. The telescoping of the elongated tube 12 allows the user of the handle 10 to adjust the length of tube 12 to the length of the shovel 26 or to a length adaptable to the arm length of the user.

Figure 3:
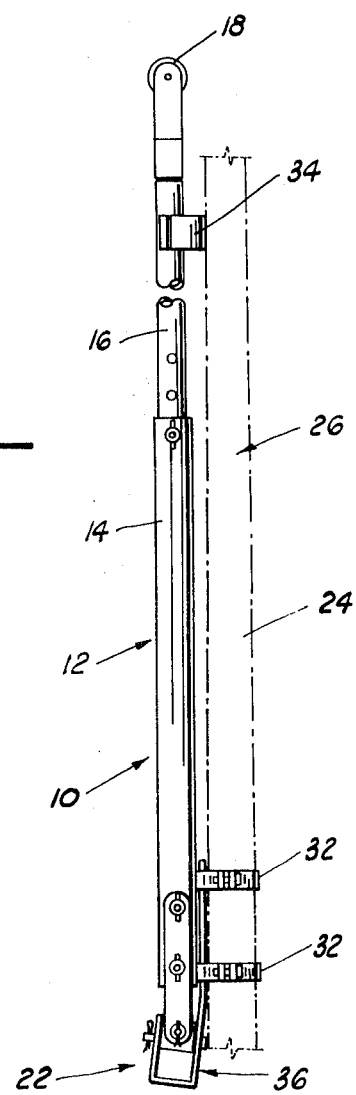
FIG. 3 is a side view of the second handle attached to the handle of the shovel.

In FIG. 3, a side view of the second handle 12 is seen disposed parallel to the shovel handle 26 and attached thereto by the spring clip 34 receiving a portion of the inner tube 16 in a snap fit. By urging the second handle 12 outwardly and to the left, the elongated tube 12 is removed from the spring clip 34. The second handle 12 is now ready for use in aiding the user of the shovel 26 in lifting, loading, or pushing the material to be handled.

Should the second handle 12 be required for use on different garden tools, the second handle 12 can be quickly removed by loosening the annular clamps 32 from around the handle 24. The clamps are slid along the length of the handle 26 and removed therefrom. Also, the spring clip can be quickly removed by unscrewing the screw attaching it to the side of the handle 26. The spring clip 34 and annular clamps 32 can then be attached to the handle of the garden tool. The mounting strap 36 is then secured to the handle of the garden tool by the clamps 32 and the second handle 10 is ready to be used.

Changes may be made in the construction and arrangement of the parts or elements of the embodiment as disclosed herein without departing from the spirit or scope of the invention as defined in the following claims.

I claim:

1. A second handle for attaching to a shovel or the like, the second handle comprising:
   an elongated tube having a first end portion and a second end portion;
   a hand grip attached to the second end portion of said tube for holding the second handle; and
   a universal joint, attached to the second end portion of said tube and attached to the shovel for pivoting said tube on the shovel, said universal joint pivoting said tube in a plane parallel to the plane of the shovel, and pivoting said tube in a plane perpendicular to the plane of the shovel, said universal jont including:
   a "J" shaped mounting strap, said mounting strap attached to the shovel by annular clamps; a swivel rotatably mounted between the "J" shaped portion of said mounting strap; and
   a pair of strap arms, one end of said strap arms pivotally attached to said swivel, the other end of said strap arms secured to the second end portion of said tube.

2. The second handle as described in claim 1, wherein said hand grip pivots on top of second end portion of said tube.

3. The second handle as described in claim 1, wherein said elongated tube includes an inner tube slidably received in an outer tube, said inner tube and outer tube having a plurality of apertures therethrough for receiving a bolt therein so that the length of said elongated tube can be adjusted.

4. The second handle as described in claim 1, further including a spring clip attached to a handle of the shovel for receiving a portion of said elongated tube and holding said tube in a snap fit when the second handle is folded adjacent to the handle of the shovel.

* * * * *